United States Patent
Blair

(10) Patent No.: US 9,251,586 B2
(45) Date of Patent: Feb. 2, 2016

(54) OPTICAL OVERHEAD WIRE MEASUREMENT

(75) Inventor: Ian Stewart Blair, North Perth (AU)

(73) Assignee: JRB Engineering Pty Ltd, West Perth (AU)

(*) Notice: Subject to any disclaimer, the term of this patent is extended or adjusted under 35 U.S.C. 154(b) by 386 days.

(21) Appl. No.: 13/574,396

(22) PCT Filed: Jan. 19, 2011

(86) PCT No.: PCT/AU2011/000056
§ 371 (c)(1),
(2), (4) Date: Mar. 7, 2013

(87) PCT Pub. No.: WO2011/088509
PCT Pub. Date: Jul. 28, 2011

(65) Prior Publication Data
US 2013/0287262 A1    Oct. 31, 2013

(30) Foreign Application Priority Data
Jan. 20, 2010    (AU) .............................. 2010900210

(51) Int. Cl.
G06K 9/00 (2006.01)
G06T 7/00 (2006.01)
B60M 1/28 (2006.01)
G01C 11/06 (2006.01)
G01S 5/16 (2006.01)

(52) U.S. Cl.
CPC ................. G06T 7/004 (2013.01); B60M 1/28 (2013.01); G01C 11/06 (2013.01); G01S 5/16 (2013.01); G06T 7/0075 (2013.01); *G06T 2207/10012* (2013.01)

(58) Field of Classification Search
None
See application file for complete search history.

(56) References Cited

U.S. PATENT DOCUMENTS

2003/0147553 A1*   8/2003   Chen et al. ..................... 382/154
2005/0201612 A1*   9/2005   Park et al. ..................... 382/154
(Continued)

FOREIGN PATENT DOCUMENTS

CN    101592484    12/2009
CN    101718551    6/2010
(Continued)

OTHER PUBLICATIONS

Kobayashi et al. "Satellite Imagery for the Identification of Interference with Overhead Power Lines" Power Systems Engineering Research Center, PSERC Publication 08-02. Jan. 2008.*
(Continued)

*Primary Examiner* — Bhavesh Mehta
*Assistant Examiner* — Oneal R Mistry
(74) *Attorney, Agent, or Firm* — Brinks Gilson & Lione; G. Peter Nichols

(57) ABSTRACT

A method (20) is described for optically measuring the three-dimensional location of one or more wires W, in a group of wires W1-Wn, such a overhead power cables in an electric rail system. A first step (22) comprises obtaining stereoscopic image data for each of the wires W from the first and second spaced apart stereoscopic camera pairs 10a and 10b which lie in the common plane P1. At step (24), image data from the first and second stereoscopic camera pairs 10a and 10b is processed to identify each of the wires W in the region of interest (12). At step (26), a determination is made of the location in 3D space of selected identified wires W using image data from one of the cameras C1 or C2; and, C3 or C4 in each of the first and second camera pairs 10a and 10b.

29 Claims, 10 Drawing Sheets

(56) References Cited

U.S. PATENT DOCUMENTS

2006/0210146 A1* 9/2006 Gu .................... G01B 11/25 382/154
2007/0263924 A1* 11/2007 Kochi et al. ................ 382/154

FOREIGN PATENT DOCUMENTS

JP          3089103      4/1991
JP          2006337253    12/2006

OTHER PUBLICATIONS

Moeller et al "Monitoring Powerline Corridors with Stereo Satellite Imagery", MAPPS/ASPRS 2006 Fall Conference Nov. 6-10, 2006 San Antonio, Texas.*

PCT/AU2011/000056 International Search Report dated Mar. 9, 2011 (3 pages).

* cited by examiner

OPTICAL OVERHEAD WIRE MEASUREMENT

FIELD OF THE INVENTION

The present invention relates to a method and system for measuring the location of an overhead elevated element such as a wire.

BACKGROUND OF THE INVENTION

Electric rail systems which are supplied with electricity from overhead power lines rely on a pantograph attached to an electric locomotive to provide a current pathway between an overhead power line and one or more electric motors. The pantograph supports a carbon brush that extends perpendicular to the direction of the overhead line. In order to maximise the life of the carbon brush and avoid damage, the overhead lines do not extend exactly parallel with the tracks on which the locomotive run, but rather are supported to meander within predetermined boundaries between the tracks. In this way the overhead line does not contact the carbon brush in the same location but rather the contact point moves from side to side along the brush as the locomotive traverses along the rail.

During the construction of the electric rail system, the location of the overhead lines is predetermined and recorded. From time to time when conducting maintenance of an electric rail system it is important to make measurements to ensure that the power lines are in their predetermined location.

SUMMARY OF THE INVENTION

According to one aspect of the invention there is provided a method of optically measuring a location in three-dimensional space of one or more wires in a group of wires comprising:
obtaining stereoscopic image data for each of the one or more wires from first and second spaced apart stereoscopic camera pairs which lie in a common viewing plane;
processing the image data from the first and second stereoscopic camera pairs for each of the one or more wires to identify each of the one or more wires in a region of interest (RoI); and,
determining a location in 3-D space of selected ones of the identified wires using image data from one camera in each of the first and second stereoscopic camera pairs.

According to a second aspect of the invention there is provided a method of optically measuring a location of one or more wires in a group of wires comprising:
arranging two stereoscopic camera pairs in a common viewing plane to view a region of interest (RoI);
traversing the RoI along a path of extent of the wires wherein the wires lie within the RoI and the viewing plane is substantially perpendicular to a direction of extent of the wires within the RoI;
capturing stereoscopic images of the wires in the RoI from each stereoscopic camera pair;
processing the stereoscopic images to identify each wire in the RoI; and,
determining a location in 3-D space of selected ones of the identified wires using image data from one camera of each of the first and second stereoscopic camera pairs.

Obtaining the stereoscopic image data may comprise separating the cameras in each pair by a distance D≥a minimum horizontal spacing between any two wires within the RoI.

Obtaining the stereoscopic image data may comprise separating the cameras in each stereoscopic camera pair by a distance D=right RoU horizontal extent+left RoU horizontal extent
wherein right RoU horizontal extent is a horizontal extent of a region of uncertainty in the position of a first wire imaged by a stereoscopic pair of cameras on a right hand side of the RoI; and,
left RoU horizontal extent is a horizontal extent of a region of uncertainty in the position of a second wire imaged by a stereoscopic pair of cameras on a left hand side of the RoI wherein the first and second wires have a minimum horizontal spacing of any two wires in the RoI.

Processing the stereoscopic image data may comprise combining planes from the same camera in each stereoscopic camera pair resulting from the projection of respective lines in the image which correspond to different edges of the same wire to produce a combined plane for that camera which contains the wire.

Combining planes from the one camera may comprise processing the image data using an edge detection filter to identify the planes which contain image data representative of an edge of the wire.

The method may comprise combining planes in the event that an angle between respective normals of the planes is close to 0°.

Combining the planes may comprise combining the planes in the event that a line of intersection of the planes is substantially orthogonal to a directional ray of that camera.

Processing the image data may comprise intersecting the combined planes for each camera in a stereoscopic camera pair to produce candidate wires.

The method may comprise associating a region of uncertainty with each candidate wire.

The method may comprise removing any candidate wire which lies below the RoI.

Processing the image data may comprise comparing a candidate wire from the first stereoscopic camera pair with that of the second stereoscopic camera pair to produce a matched candidate wire.

In one embodiment respective candidate wires from each stereoscopic camera pair are considered to constitute a matched candidate wire where the candidate wires have overlapping regions of uncertainty.

In another embodiment respective candidate wires are considered to constitute matched candidate wires where the candidate wires have overlapping regions of uncertainty and the respective candidate wires extend in the same direction.

Determining the location of an identified wire may comprise triangulation of a matched candidate utilising the combined plane from each of an outer most camera in each stereoscopic camera pair.

Triangulation may comprise determining the 3-D location of respective points of a line produced by intersecting the combined planes from each of the outer most cameras and which lie in respective reference planes which are parallel to the common viewing plane.

The method may comprise capturing the stereoscopic image data for successive spaced apart frames and wherein determination of a location in 3D space of the selected one of the identified wires comprises determining the location in 3D space of the one or more wires in each of the frames.

The method may comprise conducting a wire tracing process through at least N consecutive frames to match a wire location in a current image frame to N−1 consecutive previous image frames, wherein a wire traced through N−1 consecutive previous frames is determined as a valid wire.

The wire tracing process may comprise projecting a wire location in a previous image frame to a subsequent image frame utilising a measured translation of the region of interest between the previous frame and the current image frame.

BRIEF DESCRIPTION OF THE DRAWINGS

An embodiment of the present invention will now be described by way of example only with reference to the accompanying drawings in which.

DESCRIPTION OF PREFERRED EMBODIMENT

An embodiment of the present invention is described in relation to optically measuring the three-dimensional location of overhead electric power lines or wires for an electric rail system. However embodiments of the invention may be utilised to optically measure the three dimensional location of different types of wires or indeed elongate members such as cables or beams.

Figure 1:
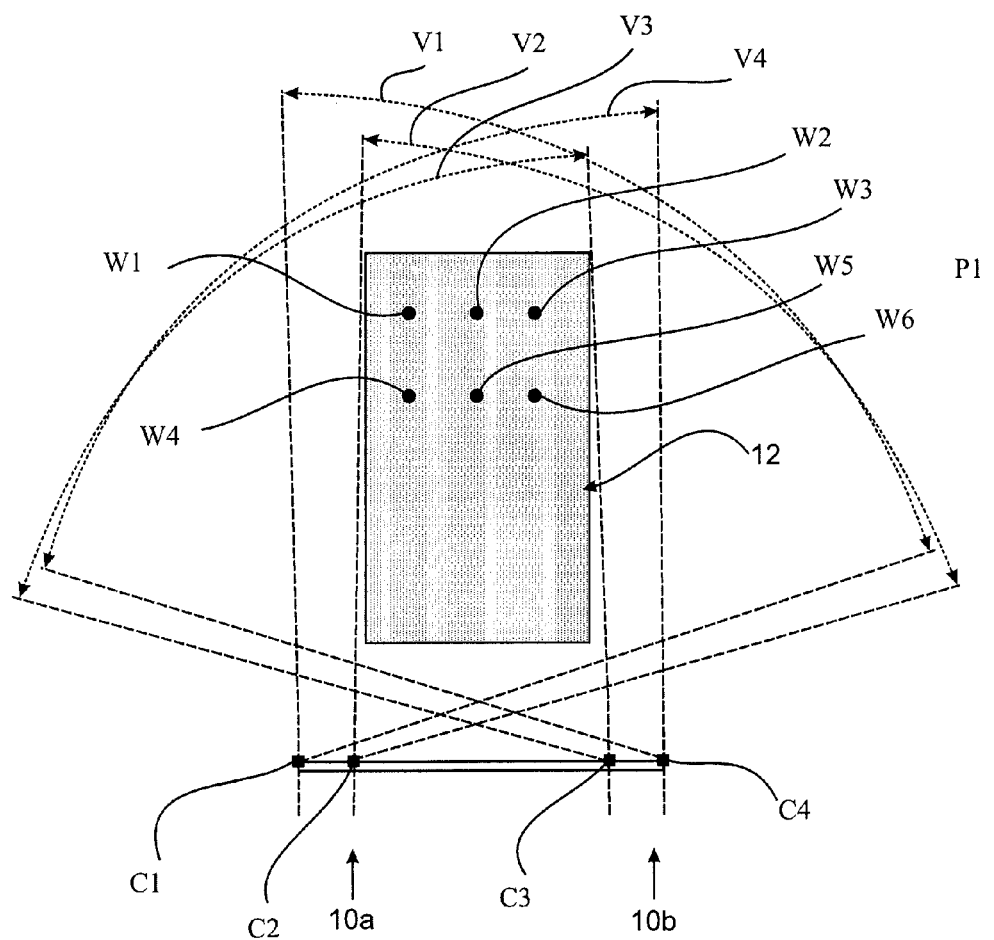
FIG. 1 is a schematic representation of a lay out of cameras incorporated in an embodiment of an overhead wire measurement system and associated method for measuring the location of overhead wires.

FIG. 1 illustrates a front on view of an arrangement of cameras utilised in an embodiment of the method. In order to perform a method, four cameras C1, C2, C3 and C4 (hereinafter referred to in general as "cameras C") are arranged in a common plane P1 to form respective first and second stereoscopic camera pairs 10a and 10b (hereinafter referred to in general as "camera pairs 10"). Camera pair 10a comprises the cameras C1 and C2 while the camera pair 10b comprises cameras C3 and C4. In FIG. 1, the plane P1 is the plane of a page. The cameras C1 to C4 are arranged to have their respective fields of view V1 to V4 overlap to view a common region of interest (RoI) 12. The RoI 12 is a region in the plane P1 which lies generally perpendicular to a direction of extent of the wires W and through which each of the wires W is expected to pass.

When the present method is used for optically measuring the location of overhead wires in an electric rail system, the cameras C may be mounted on a vehicle such as a hi-rail which can be traversed along rail tracks above which the wires W extend. Thus while the hi-rail traverses in the general direction of extent of the wires the RoI 12 lies generally perpendicular to the direction of the extent of the wires W.

Figure 2:
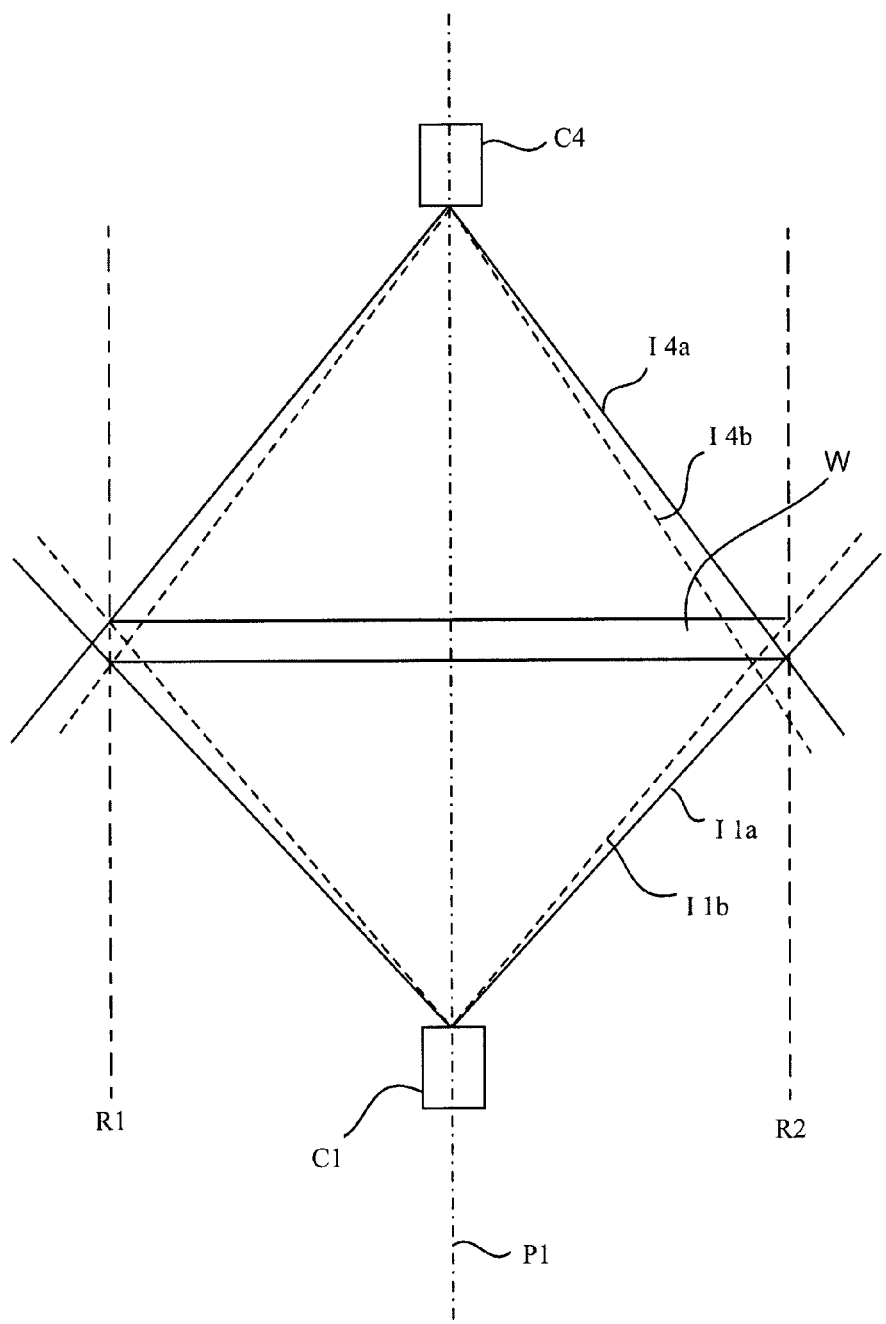
FIG. 2 is a schematic top elevation view of two cameras incorporated in the system capturing an image of a portion of a wire.
Figure 3:
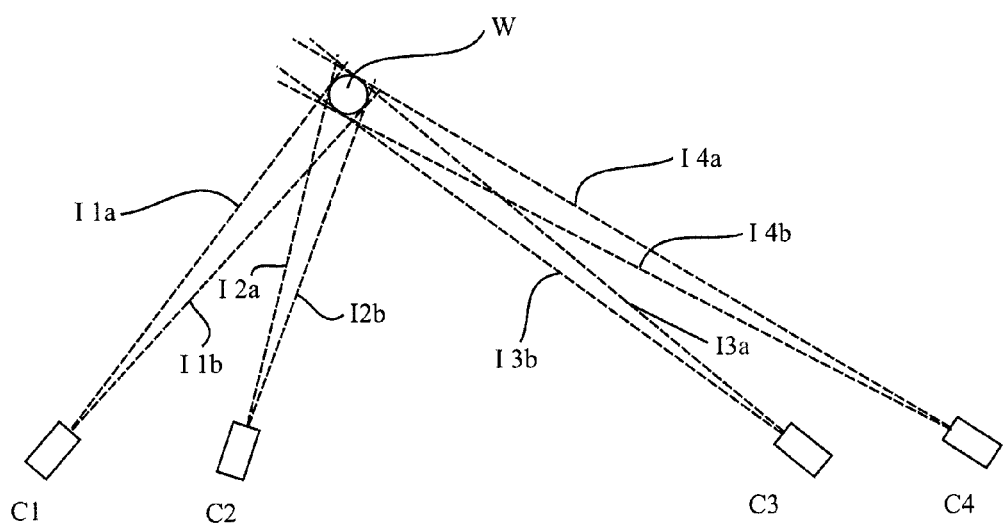
FIG. 3 is a schematic representation from the front of the cameras in the system capturing an image of a wire.

FIG. 2 illustrates in plan view the outer most cameras C1 and C4 of the camera pairs 10a and 10b respectively when imaging one of the wires W. For simplicity the remaining wires as well cameras C2 and C3 are not shown. The position of a wire W is measured as a lateral and vertical position on respective reference planes R1 and R2 which in this particular embodiment are equally spaced ahead of and behind the common plane P1. There is however no requirement that the planes be so spaced. The planes R1 and R2 are software configurable and thus in other embodiments they can be spaced differently relative to plane P1 and indeed may both be on the same side of P1. The planes R1, R2 and P1 are parallel to each other and thus normal to a direction of travel of a vehicle on which the cameras C are mounted. In one embodiment, the spacing between the reference planes R1 and R2 may be for example in the order of 375 mm. While each of the cameras C will capture an image of the wire W together with images of the surrounding space, the image data from each camera C of most interest is that contained in camera planes which coincide with edges of a wire W. For example with reference to both FIGS. 2 and 3 and considering the camera C1, these planes are marked as planes $I_{1A}$ and $I_{1B}$ respectively. Similarly, for cameras C2-C4, these planes are denoted as Ixa and Ixb where X equals 2, 3, 4. From FIG. 2, it will be apparent that the planes Ixa,b may be considered as triangular sections of the plane where the edges of each plane Ixa,b which diverge from a corresponding camera C coincide with visible edges of the wire W.

Figure 4:
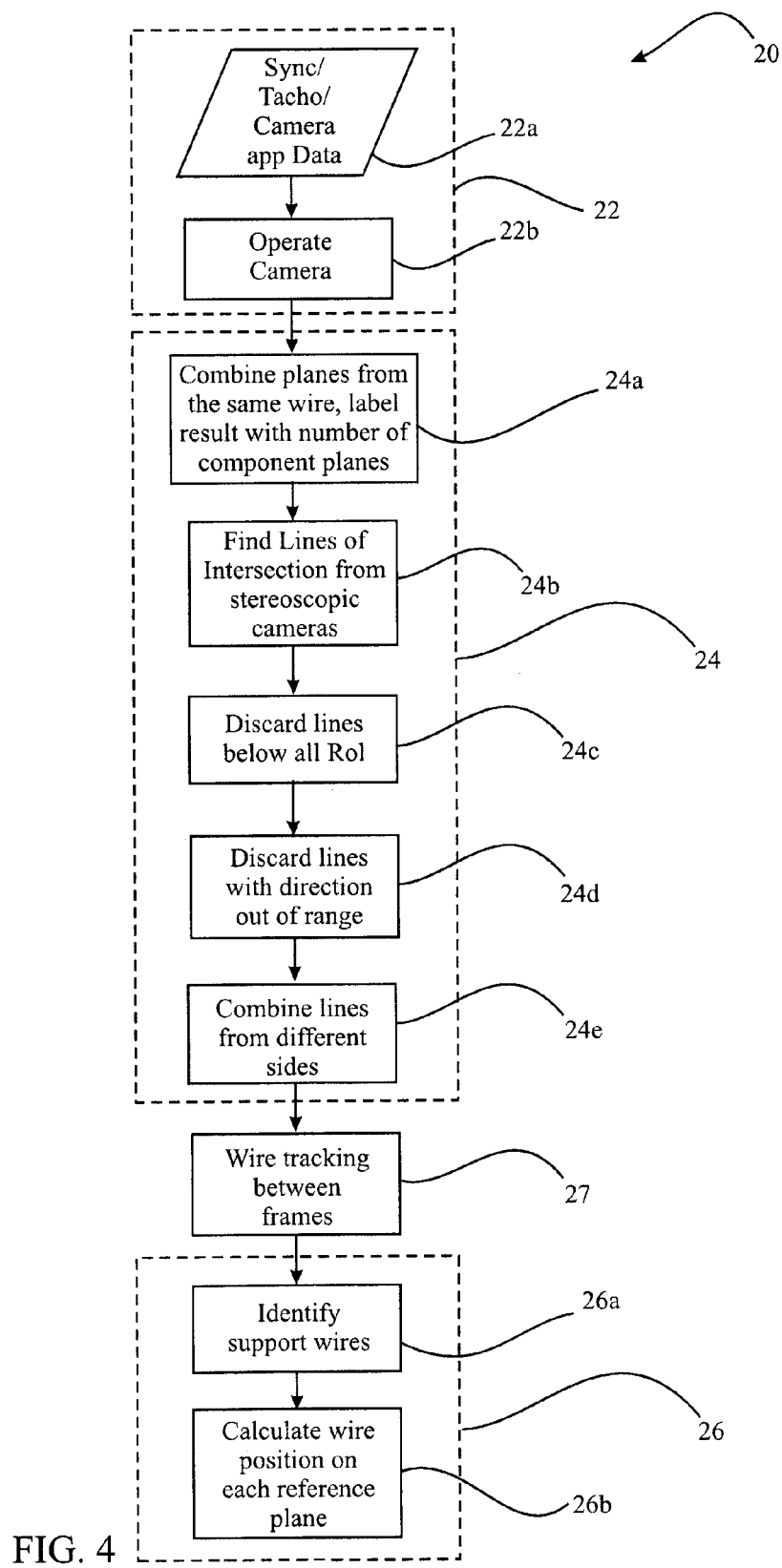
FIG. 4 is a flow chart illustrating steps in the method for measuring the location of an overhead wire.

FIG. 4 depicts in the general sense an embodiment of a method 20 for optically measuring the three-dimensional location of one or more wires W in a group of wires W1-Wn. In this embodiment, the method 20 comprises in general three steps 22, 24 and 26. Each of the steps 22, 24, 26 comprise respective combinations of further steps. In broad terms however, step 22 comprises obtaining stereoscopic image data for each of the wires W from the first and second spaced apart stereoscopic camera pairs 10a and 10b which lie in the common plane P1. At step 24, image data from the first and second stereoscopic camera pairs 10a and 10b is processed to identify each of the wires W in the region of interest 12. At step 26, a determination is made of the location in 3D space of selected identified wires W using image data from one of the cameras C1 or C2; and, C3 or C4 in each of the first and second camera pairs 10a and 10b.

Looking at the steps of the method 20 in slightly more detail, step 22 comprises a combination of a synchronisation step 22a, and step 22b of operating the cameras C. Step 22a ensures that the cameras C and the tacho of a vehicle on which the camera C are mounted are synchronised so that the cameras are triggered to capture images at known spacings along a track on which the vehicle travels. This enables the present method and system to correlate a determined 3D position of a wire segment with the location of that wire segment along the entire length of the overhead cable system.

Step 24 comprises sub-steps 24a-24e. In brief, step 24a comprises combining image planes from the same camera for the same wire to produce a combined image plane for that wire. In step 24b, the combined planes for the cameras in each stereoscopic pair are combined to identify candidate wire positions within a region of uncertainty. This is explained in greater detail below. This step may be considered as providing a "coarse" identification of possible wire position. In identifying candidate wires, wires which lie below the RoI 12 are discarded at step 24c. Wires outside, but not below the RoI are retained, as they may assist in eliminating irrelevant image planes from consideration. Similarly, at step 24d, candidate wires which have a direction outside of a predetermined range are also discarded. Typically, this direction is the "X" in an X, Y, Z coordinate system where X is the direction of the track above which the wire extends. Any candidate wire which extends in a direction substantially away from the X direction is considered as an error. Finally, at step 24e, image data from each of the stereoscopic camera pairs 10a and 10b are combined. Candidate wires which match during this combination process are considered as identifying real segments of wires W. Combining the stereoscopic image data from the camera pairs 10a and 10b results in a much smaller region of uncertainty providing a "fine" measurement of wire position.

In step 24, not only are the current carrying wires W4-W6, but also their corresponding support wires W1-W3 will be identified. However, the position of the support wires is of no consequence. Thus at step 26a these wires are identified and subsequently excluded from the processing of step 26b. At step 26b, the 3D position of a matched candidate is calculated. Due to step 26a, step 26b is performed only on the current carrying wires not on the support wires identified in the previous step 26a. As explained in greater detail below, step 26b is accomplished by triangulation using image data from the outer most cameras C1 and C4.

The method 20 also includes an optional step 27 between the steps 24 and 26. The optional step 27 is a wire tracking step in which the location of a matched wire candidate in one frame is tracked through N previous frames. If the matched candidate in a particular frame can be matched to N previous frames, then the matched candidate is deemed to represent a real wire or wire segment. Conversely, if a matched candidate in one frame cannot be tracked through N previous frames, the matched candidate is rejected. However as described later the candidate wire is retained for potential matching with future candidates.

Figure 5:
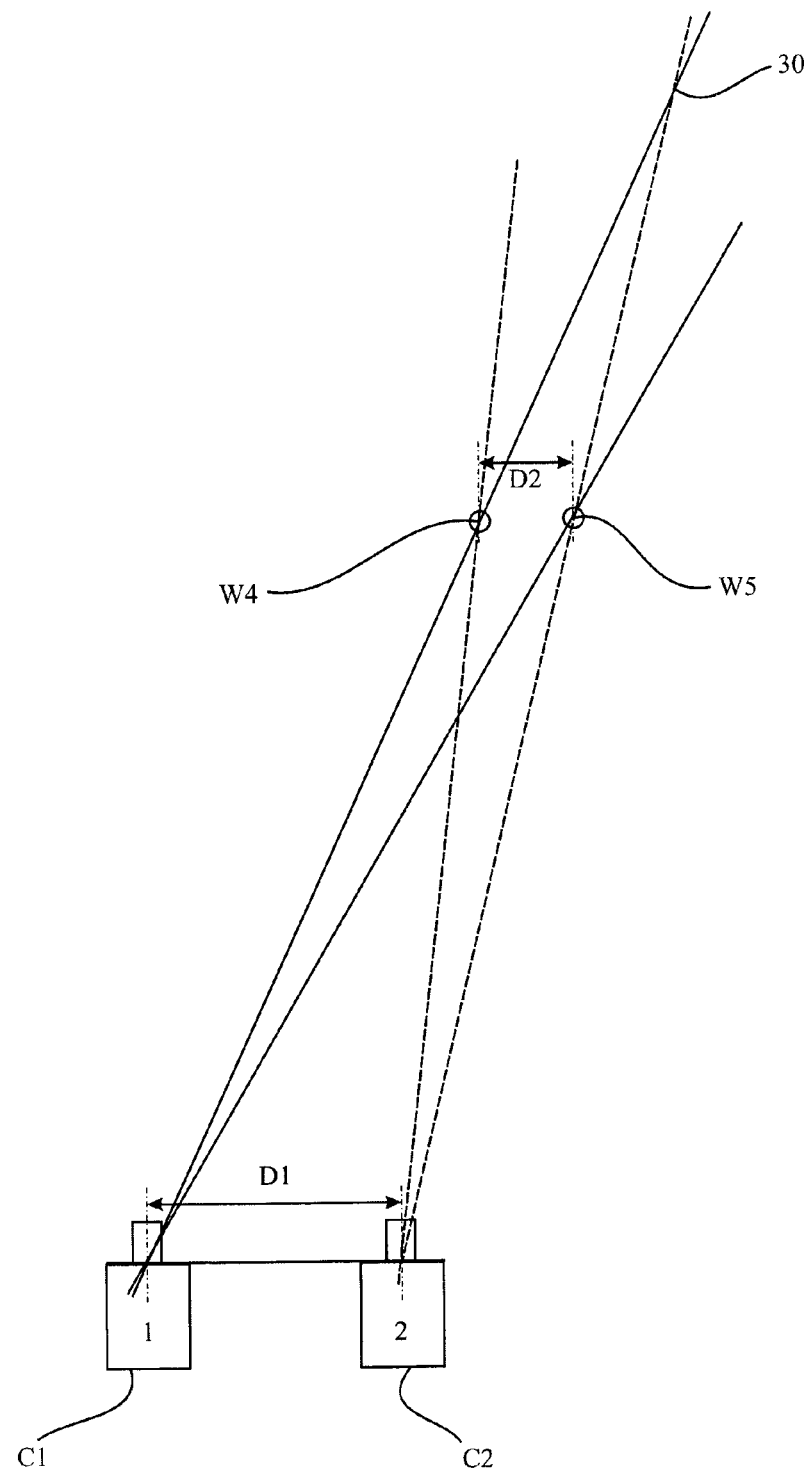
FIG. 5 is a schematic representation illustrating relative spacing of cameras in the system and wires which may generate errors.

One precursor to, or aspect of, step 22 is determining a separation or distance D1 between cameras C in respective camera pairs 10. This requires the consideration of two competing factors. Firstly, the cameras C of any particular camera pair 10 should be able to resolve two separate wires without false intersection of the cameras rays. For example, with particular reference to FIG. 5, if two wires W4 and W5 are horizontally spaced by a distance D2 which is less than the distance D1, the rays of the two cameras C1 and C2 will angle toward each other. This results in a false intersection 30 above the wires W4 and W5. This leads to ambiguity as to whether a camera C is viewing two wires side by side or one wire above the other. Closer together cameras C of a particular camera pair 10 can resolve closer together wires W. Thus ambiguity of this type may be minimised when D1 is less than or equal to D2.

Figure 6:
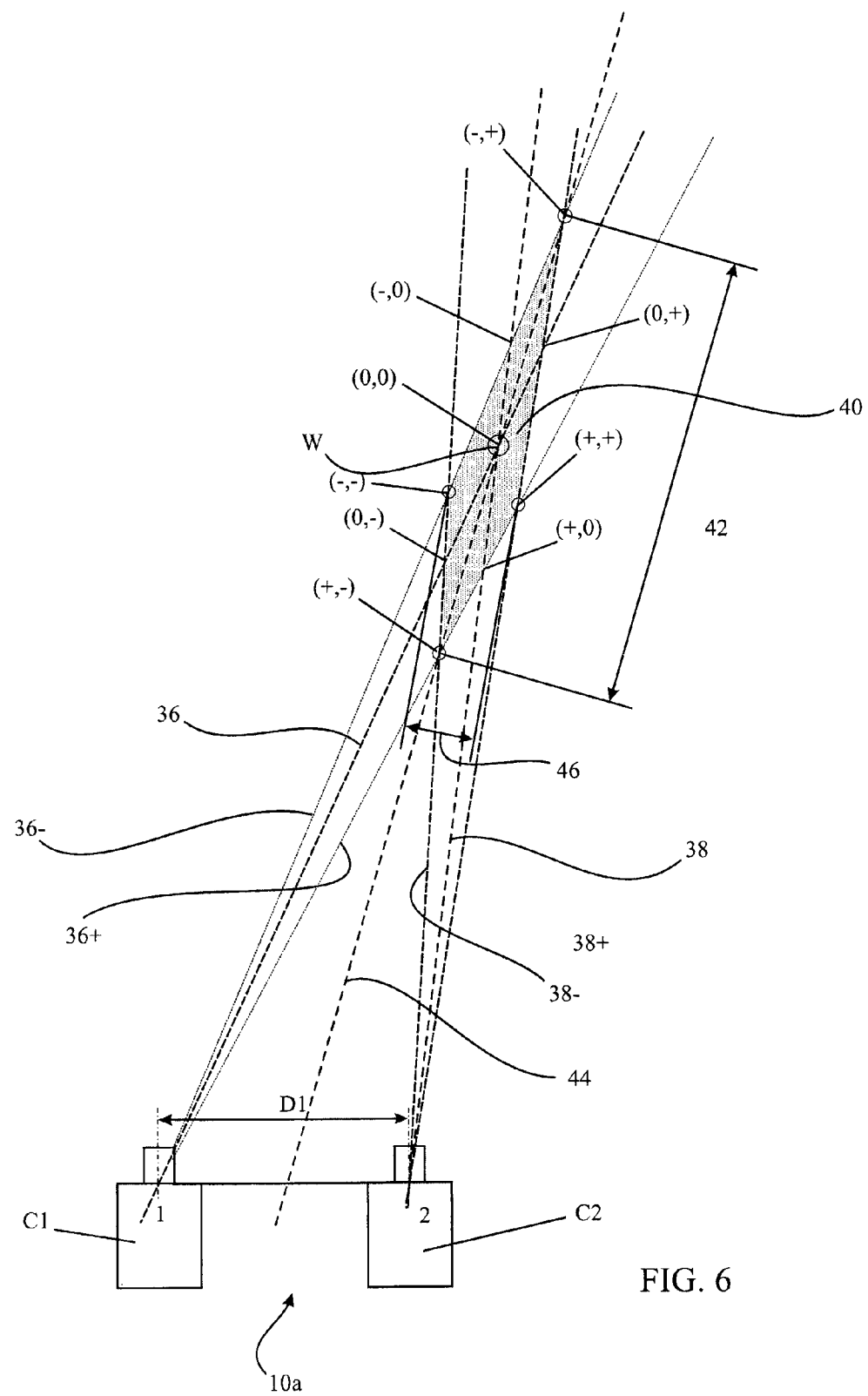
FIG. 6 illustrates a region of uncertainty associated with stereoscopic image capture.

A second factor is an error associated with triangulation of wire position. Error of measurement in imaging, image processing and combining results between cameras, means that the angle at which a ray exits a camera C has a degree of uncertainty. This may be modelled as a shift in a line produced by an image of a wire W of N pixels in either direction. For a given axial wire position, the wire may be reported as lying anywhere within a region bound by the most uncertain rays from the two cameras in a particular pair 10, corresponding to a shift of ±N pixels. This is illustrated in FIG. 6 which depicts cameras C1 and C2 of the camera pair 10a viewing a wire W. A camera ray 36 from the centre of camera C1 passes through the wire W, while camera ray 38 from the camera C2 passes through the wire W. Rays 36+ and 36− represent the ray 36 shifted by + and −N pixels respectively, while rays 38+ and 38− represent the camera ray 38 shifted by + or −N pixels respectively. The shifted rays produce a region of uncertainty (RoU) 40 in the plane P1 in which the wire W may exist. The RoU 40 has a height 42 which is measured parallel to a line 44 which extends centrally between the camera C1 and C2 and through the wire W; and a width 46 measured perpendicular to the line 44. In addition however the region of uncertainty 40 also has a vertical extent which comprises the vertical component of the height 42, and a horizontal extent corresponding with the horizontal component of the width 46. For a given wire position the vertical and horizontal extent of the region of interest reduces as camera separation D1 increases. Further, the vertical and horizontal extent change for different wire positions within the RoI 12.

Figure 7:
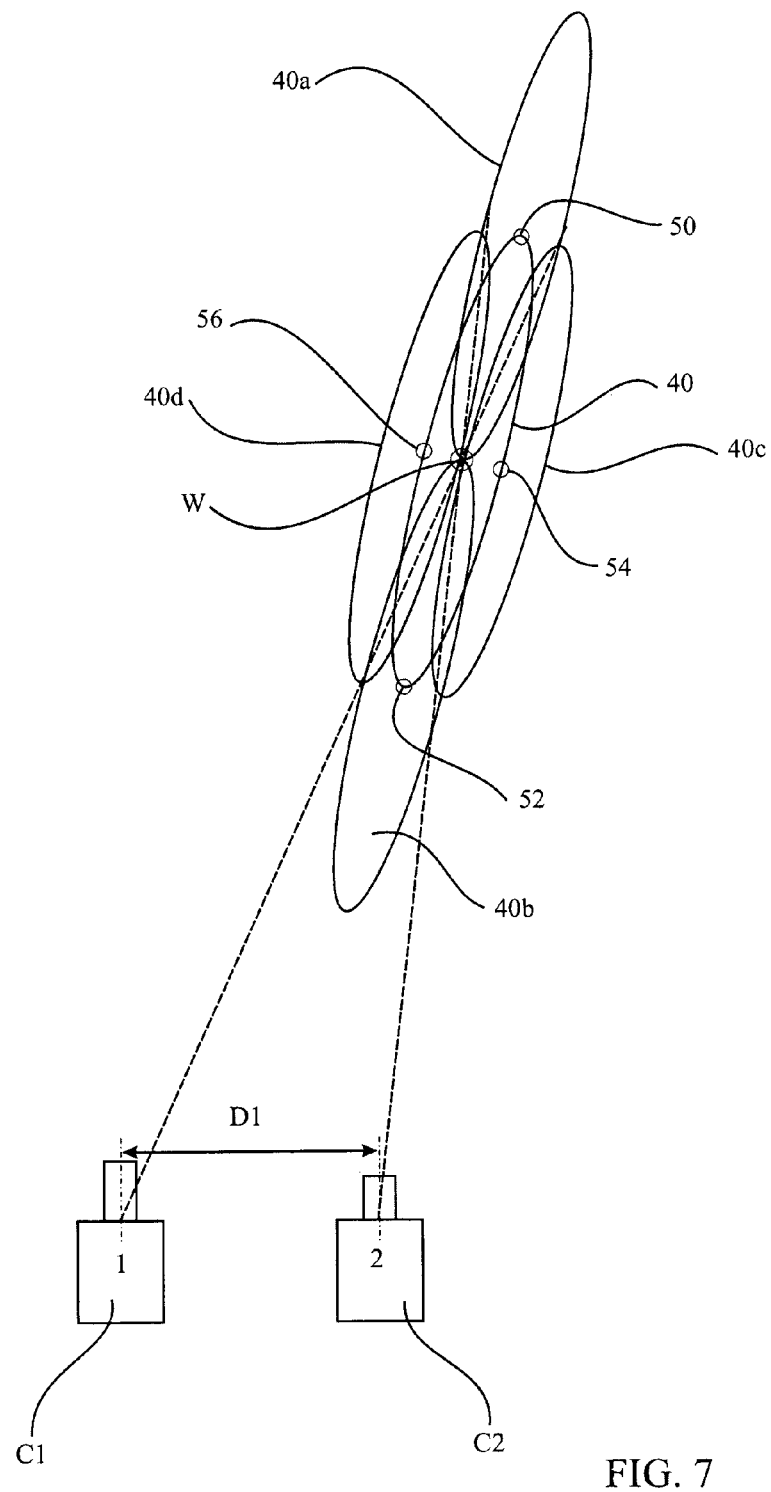
FIG. 7 illustrates a doubling effect of the region of uncertainty shown in FIG. 6.

Given a reported wire position from a stereoscopic camera pair 10, the possible region in which the actual wire position may lie is the same size as the RoU 40. Therefore if the true wire position were on the boundary of the RoU 40 of a reported wire position, the total region where the wire could be inferred to exist is twice the height and twice the width of the RoU 40. This is illustrated in FIG. 7 which depicts the camera C1 and C2 viewing wire W. The RoU 40 centred about the wire W represents the original region of uncertainty as per FIG. 6 but smoothed to be in the shape of an ellipse. If the wire W were reported at the top 50 of the region 40, then the true wire position could be anywhere within a region 40a which is the same shape and size of a region 40 but centred at the top of the reported wire position. Similarly, if the wire W is reported at a location 52 at the bottom of the RoU 40, then the true wire position could be anywhere within the region 40b. If the wire W is reported at location 54 on the right of the RoU 40, or at position 56 on the left of the RoU 40, then the true wire position could be anywhere in the regions 40c and 40d respectively. The RoU 40 may be modelled as horizontal and vertical error bars associated with the reported location of a wire W.

Figure 8:
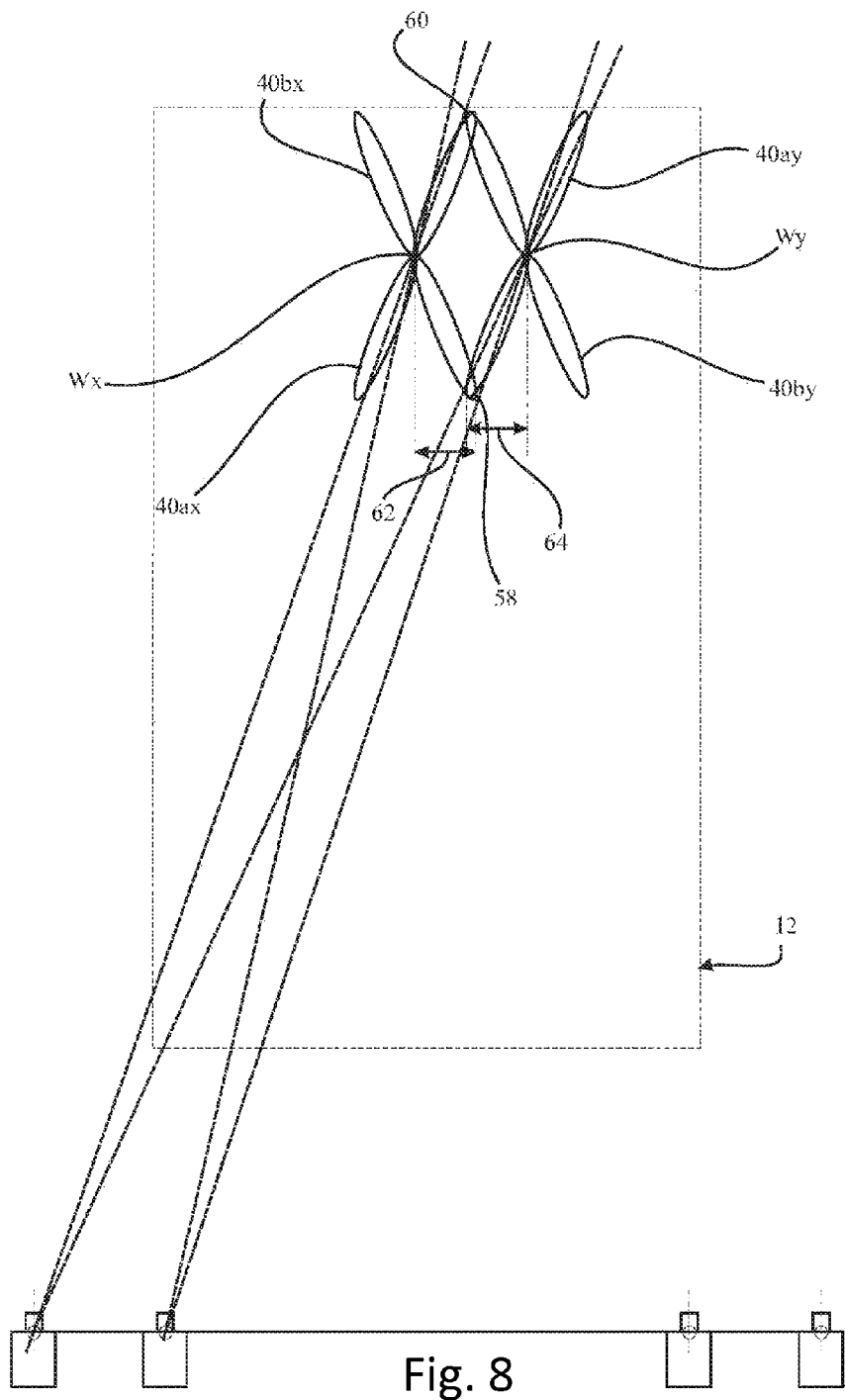
FIG. 8 illustrates the relationship between spacing of cameras for respective stereoscopic camera pairs and wire spacing which may generate false indications of wire positions.

As explained in greater detail below, the method 20 comprises combining image data from each of the stereoscopic camera pairs 10a and 10b. In particular, if the RoU 40 around the results reported from the camera pairs 10a and 10b intersect, it is concluded that the wire W exists in the intersection. However, a false positive result may be reported if two wires W are sufficiently close so that the regions of uncertainty for the camera pairs 10a and 10b from different wires W intersect. This is illustrated in FIG. 8. This figure illustrates the camera pairs 10a and 10b viewing wires Wx and Wy. The regions of uncertainty around the wires Wx and Wy viewed from the camera pair 10a are depicted as 40ax and 40ay respectively. Similarly, the regions of uncertainty around the wires Wx and Wy viewed by the camera pair 10b are illustrated as the regions 40bx and 40by respectively. From this it can be seen that the regions 40bx and 40ay intersect at two locations 58 and 60. Moreover, as shown in FIG. 8, the intersections 58 and 60 exist when the horizontal extent 62 of the region of uncertainty associated with the right stereoscopic camera pair 10b viewing the wire Wx overlaps with the horizontal extent 64 of the region of uncertainty around the reported result of the stereoscopic camera pair 10a viewing the wire Wy.

The minimum separation of the wires Wx and Wy to avoid false positive results is dependent on the total horizontal extent of the region of uncertainties from the left and right stereoscopic pairs 10a and 10b. To avoid ambiguous results in the stereoscopic pair, the cameras C in each pair 10 should be close together. However to avoid the region of uncertainty being too large, the camera C1 and C2 should be far apart. The minimum wire separation which can be ambiguously resolved by a stereoscopic camera pair 10 is equal to the camera separation D1. A balance is found when this is equal to the minimum separation before the RoU 40 of the two sides intersect. Thus, to provide unambiguous results, D1=right RoU horizontal extent+left RoU horizontal extent.

As the horizontal extent changes based on the position of the wire within the RoI 12, the camera separation D1 may ideally be checked for several points within the RoU. Possible points for checking the camera separation D1 for a rectangular RoI 12 as shown in FIG. 1, comprise the corners of the RoI and the centre of the RoI.

Each of the cameras C has an associated software application for processing image data from the camera C. Prior to use of the method 20, the respective camera applications are calibrated using a common real space origin and coordinate system. This can be achieved by employing a common calibration block which is held in the same position for all of the cameras C. The calibration block may be provided with four planar surfaces forming a box like structure where each surface is provided with a plurality of dots at known positions in real space. The use of such calibration blocks for the calibration of cameras is known in the art and described for example in U.S. Pat. No. 7,492,448. The use of the calibration block enables the calculation of a transformation matrix for each camera. The matrix allows conversion between a point in the image space and a corresponding line in real space passing through the camera's centre of projection.

In performing the method 20, the cameras C are operated to capture an image of the wires W at known intervals or spacings. Spacing can be determined by use of a tacho associated with the vehicle on which the cameras C are mounted. Thus, in one embodiment, the tacho of the vehicle may be associated with the cameras C to trigger the cameras C to take image of the wires W at intervals which enable the calculation of wire positions every say 500 mm. The cameras C take images of a segment of wire, W in planes which may be considered as being of infinite extent projecting from the camera and containing a line of the image however for the purposes of embodiments of this method, the planes of concern are the much smaller triangular plane segments Ixa,b which are bounded by the visible edges of the wire. Collection of image data for these planes enables the determination of the end points of the wire segment W in the planes R1 and R2. Thus, each image frame enables the reporting of the position of a wire in two spaced apart planes R1 and R2. Accordingly, in the present example with the planes R1 and R2 spaced apart by a distance of 375 mm, operating the cameras C to trigger on the basis of tacho count from the vehicle for say every 750 mm of track traversed by the vehicle will enable calculation of wire position every 375 mm of track.

In step 24 of the method 20, the planes Ixa and Ixb of each camera C which correspond to different edges of the same wire W are combined (step 24a). The planes Ixa and Ixb are determined using known edge detection filters such as Canny and Sobel filters. For example, with reference to FIG. 3, the image planes $I_{1a}$ and $I_{1b}$ which correspond to different edges of the same wire W viewed by camera C1 are combined. It should be noted however that a wire may comprise more than two edges. For example an edge may appear on a wire W due to reflection of sunlight. The planes Ixa,b from the same camera C are combined if they are sufficiently close such that it is likely they correspond to the same wire W. If the planes Ixa,b are close together and close to being parallel the planes Ixa and Ixb will be considered as sufficiently close to be combined. The planes are close together if the angle between the normals of each plane is close to zero. For example for a wire W having a 12.5 mm diameter and, in the worse case scenario appearing in a closest corner of the RoI 12 a theoretical dot product between the two normals of the planes would be 0.9987 corresponding to an angle of 0.9985°. Wires W at different locations within the RoI 12 will give a small angle and hence a larger dot product.

A determination as to whether the planes are close to being parallel is made by calculating whether a line of intersection between the planes Ixa and Ixb is close to orthogonal to the cameras directional ray. The line of intersection of the planes Ixa,b passes through centre of projection of the camera C in question. The directional ray of a camera C is ray orthogonal to the image plane of the camera, that is the ray passing through the centre of projection of the camera and, in an uncropped image, the centre of that image.

The combined plane for each camera C of a stereoscopic camera pair 10 is a plane containing the weighted mean of the normal of the planes Ixa,b and which contains the centre of projection of the camera C. The weighted mean of the normals is determined as follows. Firstly, each normal is normalised to have a length of 1. The weighting should relate to the length of the wire segment represented by that plane Ixa,b, which can be approximated by the sine of an angle between the edges of the triangular segments of the plane Ixa,b. The lines used to make the triangular segment of the combined plane should be based on those from the component planes projected onto the new plane. The two which make the largest positive and largest negative angle to the cameras central ray may be used.

Figure 10:
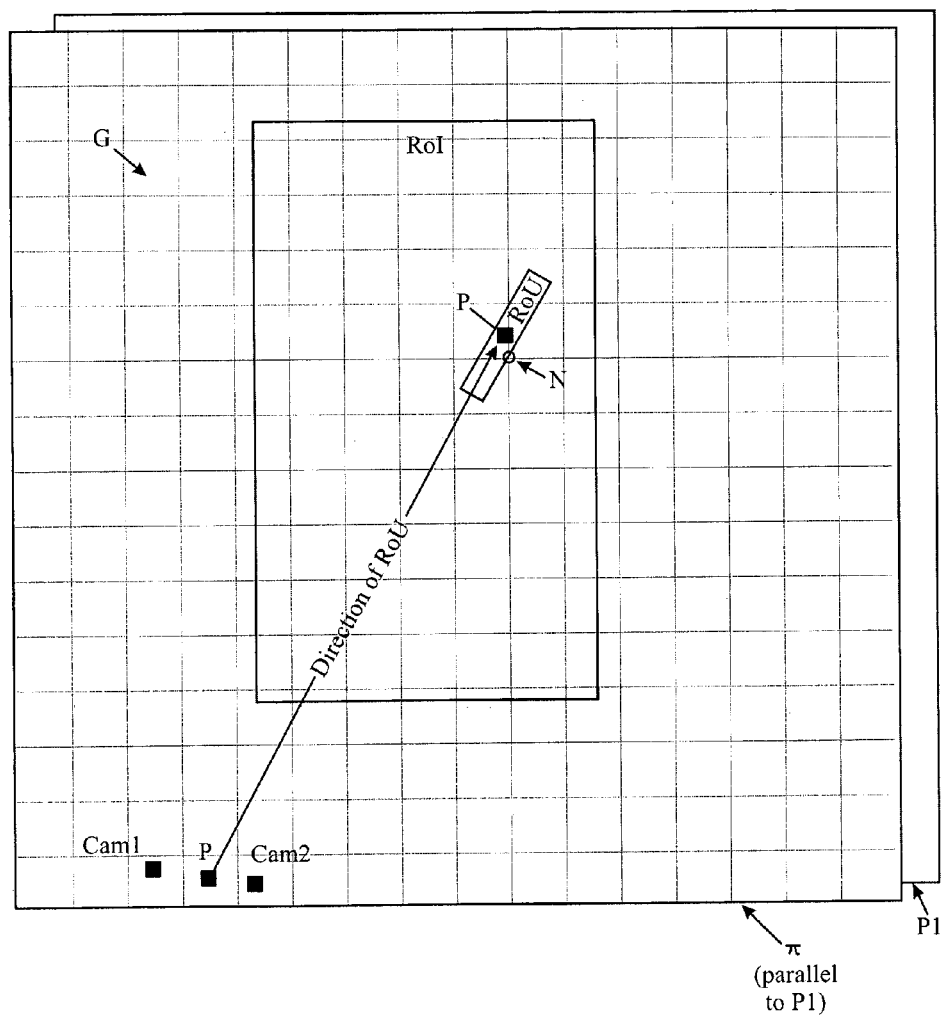

The combined planes from each of the cameras C in a particular camera pair 10 are then processed to produce initial candidate wires which, as described before in relation to FIG. 6, have an associated region of uncertainty. The size of a region of uncertainty is constant for a wire in a given position for a fixed camera layout and assuming a predetermined pixel error N. These values can be pre-calculated and stored in a memory device accessible by a processor which is used to perform the present method. These uncertainty values should be selected based on where the wire intersects the common plane P1. With reference to FIG. 10, this may be achieved as follows. The region of interest RoI plus some of the surrounding area of this plane may be divided into a grid G. The region of uncertainty RoU may be modelled as a rectangle of known height and width where the rectangle is rotated a known amount from the vertical located at a central point of each grid element. Assigning a region of uncertainty for a wire may comprise the following steps:

Use the mean of the cameras' centres of projection X values to determine where the reference plane π 'in line with the cameras', parallel to the common plane P1, lies.

Intersect the wire with π to produce point P.

Suppose the wire is found from cameras C1 and C2. Find the mean of the centres of projection of these cameras, call this $P_c$. The main direction of the region of uncertainty is the vector from $P_c$ to P.

Determine the closest grid point N to P. Look up the width and height of the region of uncertainty from this grid element.

Model the region of uncertainty as a rectangle with the given width, height and direction (i.e. rotation).

If a candidate's region of uncertainty overlaps with more than one other wire's region, the candidates which are closest together should be used. The distance measure to use is the distance between their points of intersections with π.

Once the candidate wires are determined for each of the camera pairs 10, the results for each of the camera pairs 10 are compared and are matched where the uncertainty bars from the candidate wires of each side overlap and the wires are sufficiently close to the same direction (step 24e). During this process, any candidate which is below the RoI (step 24c) is removed as this region does not contain any wires. In addition wires which are determined as extending in a direction which diverges by greater than a predetermined threshold (for example ±20° or more preferably ±10°) from a direction of travel of the vehicle on which the cameras C are mounted, are also removed (step 24d). When combining the results from the stereoscopic camera pairs 10a and 10b, a check is also made for any unmatched candidates and planes for an intersection of three camera planes. This is to ensure that one wire which lies directly behind another wire with reference to any one of the cameras C1-C4 and thus would be invisible to that camera (i.e. visible in three of the four cameras) at the time of image capture is not erroneously discounted.

The position of a match candidate which is deemed to identify a real wire W is determined by triangulation using the outermost cameras planes (step 26b). In this instance, these are the planes from the cameras C1 and C4. More particularly, the intersection of the combined planes for the cameras C1 and C4 for a match candidate produces a line which may be considered as coinciding with a centre of a segment of the wire W between the reference planes R1 and R2. The three-dimensional location of the end points of this line is determined using the intersection of the edges of the corresponding triangular plane I and the line. Assuming the wire W to be straight, and knowing the two end points in 3D space, the direction of the wire and its position in 3D space can be determined.

Accuracy of the method 20 may be enhanced by comparing successive frames from the cameras C to match wires in one frame to those of several successive previous frames (step 27). This process, known as "wire tracking", may be performed by maintaining a list of wires found in any one particular frame and comparing them to a list of wires found in previous frames. This requires previous frames wires to be translated against the direction of travel of the vehicle on which the camera C are mounted to take account of the movement of the real space origin which is fixed relative to the vehicle. Tacho counts from the vehicle for each successive image plane may be used to calculate this translation.

If wires on two lists are sufficiently close they are deemed to be the same wire. Comparison is made between the wires both in terms of their intersections with a reference frame and their direction. When determining whether the wires are sufficiently close to be deemed as the same wire, a threshold may be used to factor in potential lateral movement of the vehicle between frames. Once a wire has been seen for a sufficient number, N of consecutive frames it is declared as a valid wire. This validity may be propagated back to previous frames where the wire was identified. It is thus possible that a frame's results will not be completed until the next N−1 frames have been processed to this point. Wires seen in a previous frame but not a current frame can be eliminated from the previous frame's list if they have not been seen in M frames. Wires in a current frame's list but not in previous frames are retained to be compared with future frames.

The present method and system when employed for detecting the position of overhead electric wires in a rail system can detect both the current carrying wires and support wires. Generally, only the current carrying wires are of interest. The support wires will normally be almost directly above the current carrying wires. This is shown generally in FIG. 1 where wires W1, W2 and W3 may be considered as support wires and wires W4, W5 and W6 as current carrying wires. Accordingly the support wires can be detected by looking for pairs of wires in approximately the same direction with very similar lateral intersections with the reference planes R1, R2 and vertical intersections differing within a known range. The top most of these wires are the support wires and can be discarded.

Figure 9:
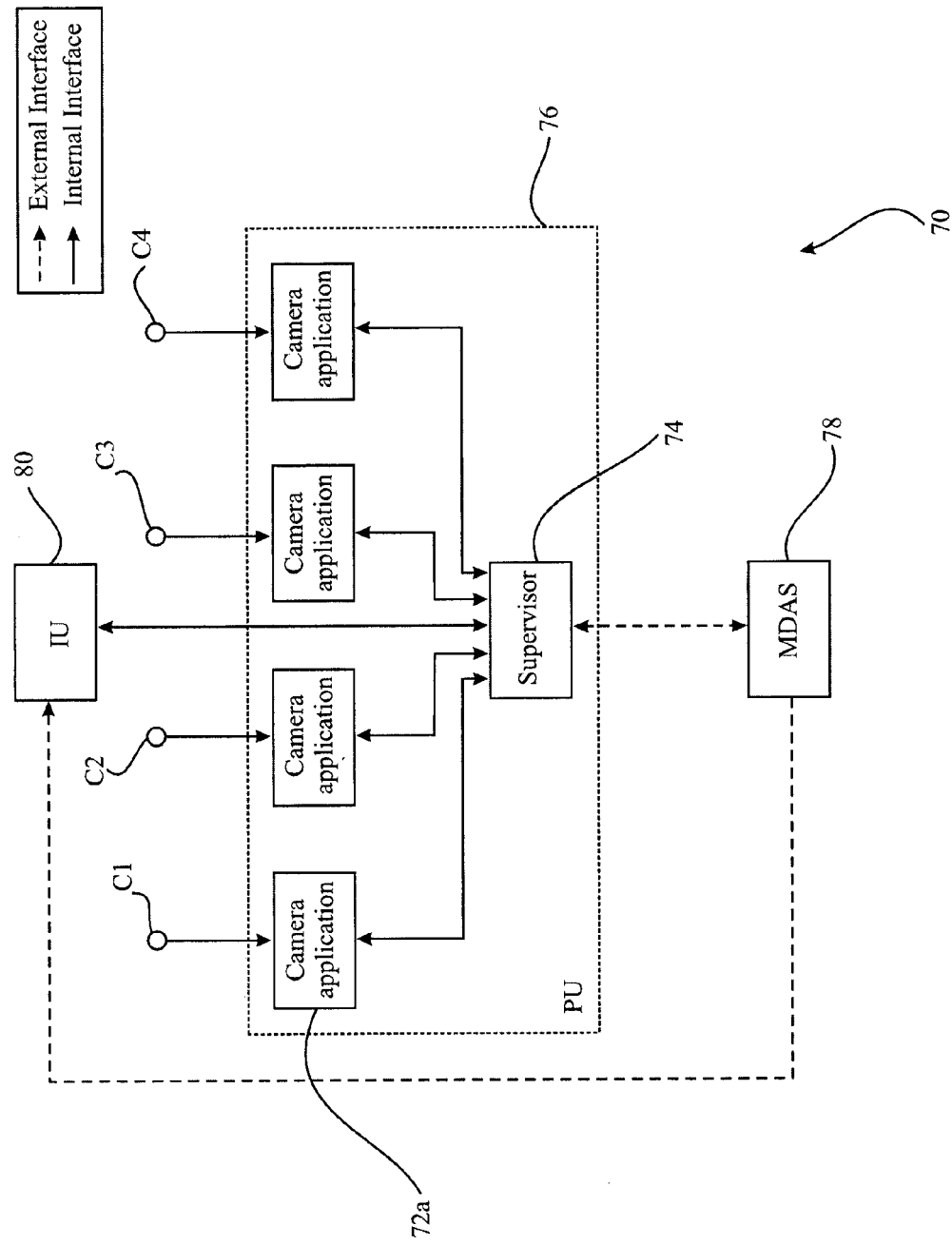
FIG. 9 is a schematic representation of the overhead wire measurement system; and, FIG. 10 is a graphical illustration of a method of assigning a region of uncertainty for a wire.

FIG. 9 depicts the general architecture of a system 70 for performing the method 20. The system 70 consists of the cameras C1-C4 each associated with a corresponding camera application 72a-72d respectively (hereinafter referred to in general as "camera applications 72"). The camera applications 72 are identical for each of the cameras C and may be implemented in any suitable programming language. The camera applications 72 are responsible for acquiring images from their respective cameras and processing these images to extract or otherwise derive the combined plane in real space corresponding to each visible overhead wire W. Thus the camera applications 72 will perform the step 22 of the method 20. A supervisor application 74 processes the image data from each of the camera applications and performs the triangulation to determine the position of the wires in real space. The camera applications 72 and the supervisor 74 are in the present embodiment implemented on a common processing unit 76. However this need not be the case and separate processors may be used for the respective implementations. The processing unit 76 will typically be supported on the same vehicle carrying the cameras C1-C4. The supervisor application 74 may communicate with a main data acquisition system (MDAS) via TCP/IP over an ethernet connection. Thus the MDAS 78 may be located remotely from the processing unit 76 and stores and may further process information from the supervisor 74 as well as send control information to the supervisor 74 and to an interface unit (IU) 80. For example, the MDAS 78 may send notification to the supervisor 74 to go online or offline, and send notification to the IU 80 to reset the tacho count. The IU 80 provides tacho information to the supervisor 74 and monitors the state of lights and camera shutters for the cameras C1-C4.

The invention claimed is:

1. A method of optically measuring a location in three-dimensional space of one or more wires in a group of wires comprising:
   obtaining stereoscopic image data for each of the one or more wires from a first stereoscopic camera pair and a second stereoscopic camera pair, which is spaced from the first stereoscopic camera pair, wherein the first and the second stereoscopic camera pairs lie in a same viewing plane;
   processing the image data from the first stereoscopic camera pair and the second stereoscopic camera pairs for each of the one or more wires to identify each of the one or more wires in a region of interest (RoI); and,
   determining a location in 3-D space of selected ones of the identified wires using image data from one camera in each of the first stereoscopic camera pair and the second stereoscopic camera pairs.

2. A method according to claim 1 wherein obtaining the stereoscopic image data comprises separating the cameras in each pair by a distance D≥a minimum horizontal spacing between any two wires within the RoI.

3. The method according to claim 1 wherein obtaining the stereoscopic image data comprises separating the cameras in each stereoscopic camera pair by a distance D=right RoU horizontal extent+left RoU horizontal extent
   wherein right RoU horizontal extent is a horizontal extent of a region of uncertainty in a position of a first wire imaged by a stereoscopic pair of cameras on a right hand side of the RoI; and,
   left RoU horizontal extent is a horizontal extent of a region of uncertainty in a position of a second wire imaged by a stereoscopic pair of cameras on a left hand side of the RoI wherein the first and second wires have a minimum horizontal spacing of any two wires in the RoI.

4. The method according to claim 1 wherein processing the stereoscopic image data comprises combining planes from a same camera in each stereoscopic camera pair resulting from the projection of respective lines in the image which correspond to different edges of a same wire to produce a combined plane for that camera which contains the wire.

5. The method according to claim 4 wherein combining planes from the one camera comprises processing the image data using an edge detection filter to identify the planes which contain image data representative of an edge of the wire.

6. The method according to claim 4 comprising combining planes in an event that an angle between respective normals of the planes is close to 0°.

7. The method according to claim 6 wherein combining the planes comprises combining the planes in an event that a line of intersection of the planes is substantially orthogonal to a directional ray of that camera.

8. The method according to claim 4 wherein processing the image data comprises intersecting the combined planes for each camera in a stereoscopic camera pair to produce candidate wires.

9. The method according to claim 8 comprising associating a region of uncertainty with each candidate wire.

10. The method according to claim 9 comprising removing any candidate wire which lies below the RoI.

11. The method according to claim 8 wherein processing the image data comprises comparing a candidate wire from the first stereoscopic camera pair with that of the second stereoscopic camera pair to produce a matched candidate wire.

12. The method according to claim 11 wherein respective candidate wires from each stereoscopic camera pair is considered to constitute a matched candidate wire where the respective candidate wires have overlapping regions of uncertainty.

13. The method according to claim 11 wherein respective candidate wires are considered to constitute a matched candidate wire where the candidate wires have overlapping regions of uncertainty and the respective candidate wires extend in the same direction.

14. The method according to claim 11 wherein determining the location of an identified wire comprises triangulation of a matched candidate wire utilising the combined plane from each of an outer most camera in each stereoscopic camera pair.

15. The method according to claim 14 wherein triangulation comprises determining the 3-D location of respective points of a line produced by intersecting the combined planes from each of the outer most cameras and which lie in respective reference planes which are parallel to the same viewing plane.

16. The method according to claim 1 comprising capturing the stereoscopic image data for successive spaced apart image frames and wherein determination of a location in 3D space of the selected one of the identified wires comprises determining the location in 3D space of the one or more wires in each of the image frames.

17. The method according to claim 16 comprising conducting a wire tracing process through at least N consecutive image frames to match a wire location in a current image frame to N−1 consecutive previous image frames, wherein a wire traced through N−1 consecutive previous image frames is determined as a valid wire.

18. The method according to claim 17 wherein the wire tracing process comprises projecting a wire location in a previous image frame to a subsequent image frame utilising a measured translation of the region of interest between the previous frame and the current image frame.

19. A method of optically measuring a location of one or more wires in a group of wires comprising:
arranging a first stereoscopic camera pair and a second stereoscopic camera pair, which is spaced from the first stereoscopic camera pair, wherein the first and second stereoscopic camera pairs lie in a same viewing plane to view a region of interest (RoI);
traversing the RoI along a path of extent of the wires wherein the wires lie within the RoI and the viewing plane is substantially perpendicular to a direction of extent of the wires within the RoI;
capturing stereoscopic images of the wires in the RoI from the first stereoscopic camera pair and the second stereoscopic camera pair;
processing the stereoscopic images to identify each wire in the RoI; and,
determining a location in 3-D space of selected ones of the identified wires using image data from one camera of each of the first stereoscopic camera pair and the second stereoscopic camera pairs.

20. The method according claim 19 wherein processing the stereoscopic image data comprises combining planes from a same camera in each stereoscopic camera pair resulting from the projection of respective lines in the image which correspond to different edges of a same wire to produce a combined plane for that camera which contains the wire.

21. The method according claim 20 wherein processing the image data comprises intersecting the combined planes for each camera in a stereoscopic camera pair to produce candidate wires.

22. The method according to claim 21 comprising associating a region of uncertainty with each candidate wire.

23. The method according to claim 22 comprising removing any candidate wire which lies below the RoI.

24. The method according to claim 21 wherein processing the image data comprises comparing a candidate wire from the first stereoscopic camera pair with that of the second stereoscopic camera pair to produce a matched candidate wire.

25. The method according to claim 24 wherein respective candidate wires from each stereoscopic camera pair is considered to constitute a matched candidate wire where the respective candidate wires have overlapping regions of uncertainty.

26. The method according to claim 24 wherein respective candidate wires are considered to constitute a matched candidate wire where the candidate wires have overlapping regions of uncertainty and the respective candidate wires extend in the same direction.

27. The method according to claim 19 comprising capturing stereoscopic image for successive spaced apart image frames and wherein determination of a location in 3D space of the selected one of the identified wires comprises determining the location in 3D space of the one or more wires in each of the image frames.

28. The method according to claim 27 comprising conducting a wire tracing process through at least N consecutive image frames to match a wire location in a current image frame to N−1 consecutive previous image frames, wherein a wire traced through N−1 consecutive previous image frames is determined as a valid wire.

29. The method according to claim 28 wherein the wire tracing process comprises projecting a wire location in a previous image frame to a subsequent image frame utilising a measured translation of the region of interest between the previous frame and the current image frame.

* * * * *